Sept. 22, 1964
C. S. STERRETT
3,149,456
GAS DAMPED THRUSTER
Filed Aug. 16, 1963
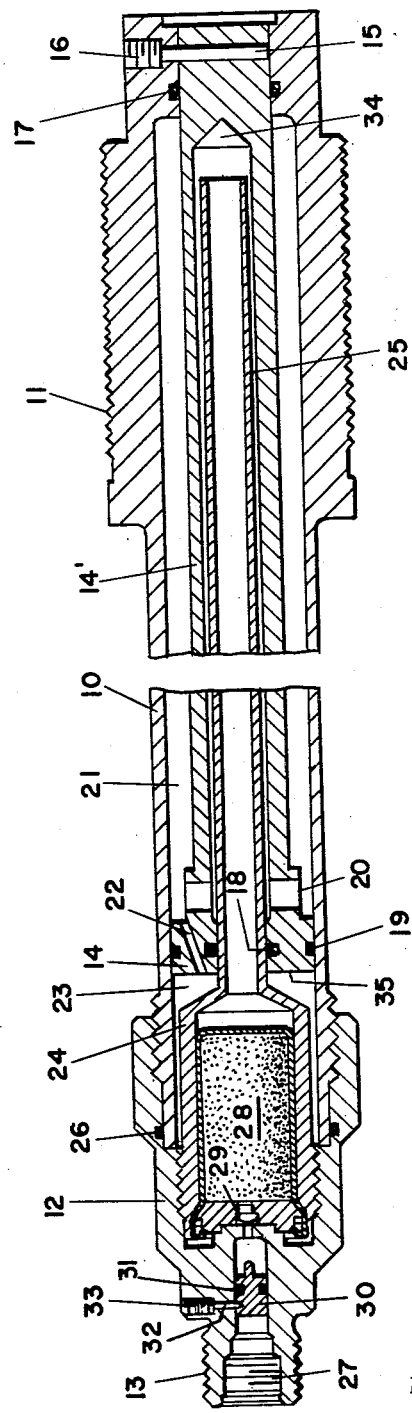
INVENTOR.
CHARLES S. STERRETT
BY Harry M. Saragovitz,
Edward J. Kelly,
Herbert Berl &
S. Dubroff    ATTORNEYS.

:::

United States Patent Office 3,149,456
Patented Sept. 22, 1964

3,149,456
GAS DAMPED THRUSTER
Charles S. Sterrett, Meadowbrook, Pa., assignor to the United States of America as represented by the Secretary of the Army
Filed Aug. 16, 1963, Ser. No. 302,752
1 Claim. (Cl. 60—26.1)
(Granted under Title 35, U.S. Code (1952), sec. 266)

The invention described herein may be manufactured and used by or for the Government for governmental purposes without the payment to me of any royalty thereon.

This invention relates to gas pressure operated devices which are commonly known as thrusters and utilized in emergency aircraft escape systems and the like. It provides an improved thruster wherein the gas utilized to actuate the thruster is also utilized to dampen its motion. This double use of the energizing gas has the advantage that it reduces the weight and size of the truster and improves its operation.

Thrusters currently in use, although qualified for aircraft use, utilize liquids such as oil for damping. The use of such buffering liquids involves storage and temperature problems. These thrusters are characteristically complex, difficult to assemble, and are heavy because the body walls must withstand the high pressure of the damping oil. Also loss of the oil adversely affects the performance of the thruster. The gas damped thruster of the present invention avoids these difficulties by utilizing the gas from the main propellant charge both to effect the power stroke of the thruster and to provide the integral damping action. As will appear, this involves the use of a combined high-low principle with dual driving faces and a single buffer face.

The invention will be better understood from the following description when considered in connection with the accompanying drawing and its scope is indicated by the appended claim.

The single figure of the drawing is a sectional view of the thruster. It includes a cylindrical body 10 which has at one end a mounting thread 11 and at the other end a head 12. The head 12 is threaded onto the body and has at its outer end a mounting thread 13. Reciprocable within the cylinder 10 is a piston 14 having a hollow rod 14' which is detachably coupled to the body by a shear pin 15, this pin being backed up by a set screw 16. At the outer end of the piston rod is a seal ring 17 and on the piston 14 are seal rings 18 and 19. Four passageways 20 extend from the interior of the piston rod 14 to a buffer chamber 21 between the inner wall of the body 10 and the outer wall of the piston rod 14. This piston and rod are hollow, the rod is closed at its outer or load moving end, and the piston has a metering orifice 22 extending from the buffer chamber 21 to a final pressure chamber 23 between the piston and a cartridge retainer 24.

The cartridge retainer 24 has a hollow neck or extension 25 which extends through the hollow piston 14 and rod 14' to a point near its closed end. The retainer 24 positioned within the head 12 which is threaded onto the end of the body 10, has between it and the body 10 a seal ring 26, and has at its outer end a gas inlet 27.

A cartridge 28, enclosed by the retainer 24, has a primer 29 and is adapted to be fired by a firing pin 30. This pin is encircled by a seal ring 31 and is detachably coupled to the head 12 by a shear pin 32 which is backed up by a set screw 33. While the firing pin 30 is shown as actuated by a gas pressure applied through the inlet 27, it is to be understood that the feature forms no essential part of the present invention and may be replaced by other well known cartridge firing means.

Firing of the cartridge 28 generates a high pressure gas in the retainer 24. This confined high pressure chamber enhances the ignition and combustion of the propellant. A movement of the piston 14 has little effect on the burning rate of the propellant due to the extended neck portion 25 of the retainer 24.

The expanding propellant gas, on emergence from the neck portion 25 of the retainer, produces the initial thrust or pushing force on the inner face 34 of the piston. As the gas continues to expand, it is forced through the void between outer wall of the neck 25 and the inner wall of the piston 14 finally passing through the passageways 20 into the damper chamber 22 and initiating the buffing or damping action. Further expansion of the gas pressurizes the main face 35 of the piston as the gas is metered through the orifice 22. The pressures on the faces 34 and 35 overcome the resistance of the shear pin 15 and the damping force. The piston and its load (not shown) is extended at a controlled rate determined by the area of the orifice 22 and the differential pressures on the driving and damping areas. As will be apparent to those skilled in the art, the shear pin 15 may be replaced by other well known means of detachably intercoupling the body 10 and piston 14.

The size of one satisfactory embodiment of the invention is indicated by the following tabulation wherein the various dimensions are expressed in inches.

| Item | Inner diameter | Outer diameter | Length |
|---|---|---|---|
| Body 10 | 1.125 | 1.42 | 12.5 |
| Piston 14 | .437 | .750 | 10.125 |
| Retainer 24 | .760 | 1.00 | |
| Retainer neck 25 | .25 | .375 | 10.125 |

The thruster of the present invention eliminates the objectionable features of liquid damped systems and effects about a 30% saving in weight and size. The operating temperature range is extended. Fewer components are involved, a simpler design is realized, and the reliability of the thruster is increased due to the elimination of oil storage and leakage problems.

Assembly of the present gas unit is less difficult since precise measurement and seals for fluids are avoided. Periodic maintenance or restoration of the units is also simplified for the reason that only the O ring packings and the cartridge have to be replaced.

I claim:
In a gas pressure operated device, the combination of
a cylinder,
a hollow piston reciprocable in said cylinder and having a hollow rod closed at its forward end, said rod forming with said cylinder a damping chamber between said rod and said cylinder,
a cartridge retainer mounted within one end of said cylinder and having a hollow neck opening at one end into said retainer and at the other end into said rod at a point near the closed end thereof, the outer surface of said neck being spaced from the inner surface of said rod,
means forming adjacent to the forward side of said piston a passageway between said damping chamber and said space between said rod and neck,
a metering orifice leading from said damping chamber to the rearward surface of said piston, and
means detachably intercoupling said cylinder and said closed end of said rod.

References Cited in the file of this patent
UNITED STATES PATENTS
1,966,608  Cardwell et al. ---------- July 17, 1934
2,877,750  Maier ---------------- Mar. 17, 1959